United States Patent [19]

Suzaki et al.

[11] Patent Number: 4,953,032
[45] Date of Patent: Aug. 28, 1990

[54] MOTION SIGNAL GENERATING CIRCUIT FOR USE IN A TELEVISION RECEIVER

[75] Inventors: Tohru Suzaki; Masato Sugiyama; Takaaki Matono; Shigeru Hirahata; Kazuhiro Kaizaki, all of Yokohama, Japan

[73] Assignee: Hitachi, Ltd., Tokyo, Japan

[21] Appl. No.: 441,569

[22] Filed: Nov. 27, 1989

[30] Foreign Application Priority Data

Nov. 30, 1988 [JP] Japan .................. 63-300477

[51] Int. Cl.$^5$ .................. H04N 7/18; H04N 9/64; H04N 5/213
[52] U.S. Cl. .................. 358/105; 358/36; 358/167
[58] Field of Search .................. 358/105, 166, 167, 36, 358/37

[56] References Cited

U.S. PATENT DOCUMENTS

| | | | |
|---|---|---|---|
| 4,090,221 | 5/1978 | Connol | 358/167 |
| 4,626,891 | 12/1986 | Achiha | 358/105 |
| 4,639,767 | 1/1987 | Suzuki | 358/105 |
| 4,651,211 | 3/1987 | Weckenbrock et al. | 358/166 |
| 4,658,285 | 4/1987 | Lewis, Jr. | 358/36 |
| 4,688,084 | 8/1987 | Achiha | 358/37 |
| 4,733,297 | 3/1988 | Katsumatu | 358/105 |
| 4,760,446 | 7/1988 | Ninomiya et al. | 358/105 |
| 4,794,454 | 12/1988 | Sugiyama et al. | 358/105 |
| 4,884,136 | 11/1989 | Ninomiya et al. | 358/105 |

FOREIGN PATENT DOCUMENTS

111586 5/1987 Japan .

*Primary Examiner*—John K. Peng
*Attorney, Agent, or Firm*—Antonelli, Terry, Stout & Kraus

[57] ABSTRACT

A motion information signal generating circuit comprises a motion detecting circuit for detecting a piece of motion information from a digitized television signal; a temporal-spatial signal processing circuit for expanding a signal representing the so detected motion information both in time and space and a noise eliminator circuit connected between the motion detecting circuit and the temporal-spatial signal processing circuit. The noise eliminator circuit has at least one 1H memory to detect the correlation between the motion information signals pertaining to two adjacent picture elements which are one horizontal sweep line part, and for instance, the motion information signal of a smaller data quantity is selected, thereby preventing appearance of a false motion signal which would be caused by a noise of increased amplitude.

12 Claims, 9 Drawing Sheets

MOTION SIGNAL GENERATING CIRCUIT FOR USE IN A TELEVISION RECEIVER

FIELD OF THE INVENTION

The present invention relates to a television signal processing circuit, and particularly to a motion signal generator which is suitable for use in producing a signal for controlling a television signal processing circuit of motion adaptive type.

A signal processing circuit which is capable of processing television signals in accordance with the instantaneous motion of a picture is very useful for providing pictures of high quality. In a receiving set which is designed for receiving composite color television signals of the NTSC system type, the correlation of a plurality of frame signals is used to separate brightness signals from color signals in a still or motionless picture whereas the correlation of a plurality of line signals is used to separate brightness signals from color signals in a motion picture, thereby suppressing dot or cross color interference. Also, in the case that sweeping lines are interpolated, in a still picture a plurality of field signals are used to provide interpolation signals whereas in a moving picture a single field signal is used to provide interpolation signals, thereby preventing appearance of line flicker and improving vertical definition.

Such motion adaptive signal processing circuits work well when picture motion is correctly detected, but if not, specifically when a picture motion is incorrectly detected, the circuit applies a motion picture processing to a still picture, or a motionless picture processing to a motion picture and thus deteriorates the quality of pictures displayed.

Figure 1:
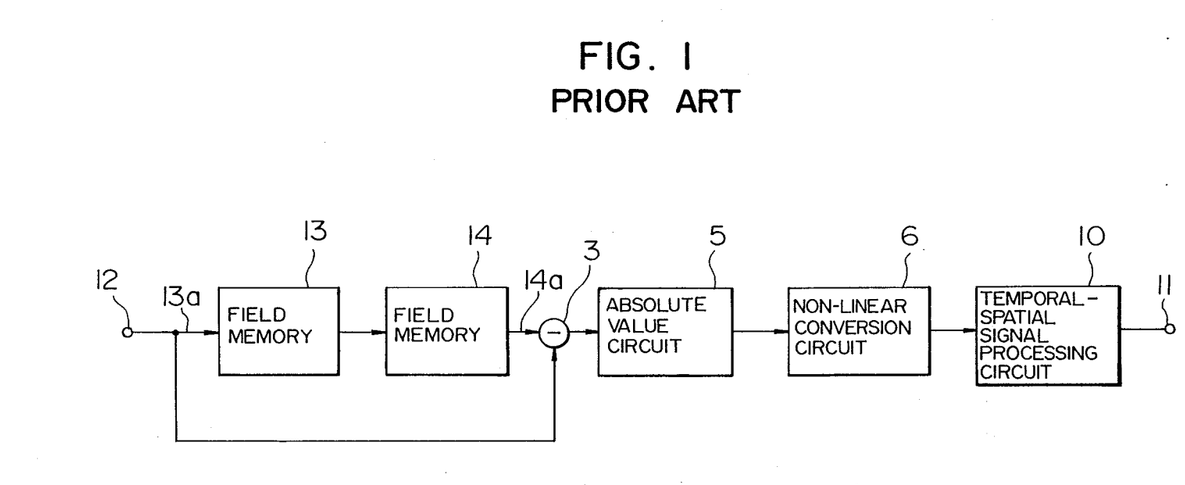
FIG. 1 is a block diagram showing a prior art motion signal generating circuit.

JP-A-62-111586 discloses a motion adaptive signal producing circuit which is capable of making a detection of quick motion at an increased success rate. FIG. 1 shows a block diagram of a motion detecting circuit in the motion adaptive signal producing circuit.

It comprises a first field memory 13 connected to an input terminal 12, a second field memory 14 connected to the first field memory 13, a subtraction circuit 3 connected to the second field memory 41 and to the input terminal 12, an absolute value circuit 5 connected to the subtraction circuit 3, a non-linear conversion circuit 6 connected to the absolute value circuit 5 and a temporal-spatial signal processing circuit 10 connected to the non-linear conversion circuit 6 and an output terminal 11. In operation an input signal is supplied to the input terminal 12, and hence to the input terminal 13a of the first field memory 13, and finally appears one frame period later at the output terminal 14a of the second field memory 14. This delayed input signal along with a subsequent input signal, which appears at the same horizontal position on the screen as the preceding delayed input signal, is applied to the subtraction circuit 3, thereby providing an interframe difference signal between the preceding delayed input signal and the subsequent input signal. This interframe difference signal is directed to the absolute value circuit 5 and then to the nonlinear conversion circuit 6. The absolute value of the interframe difference signal is represented in the same number of bits (for instance 8 bits) as the digitized television signal. In the non-linear conversion circuit 6 an eight-bit signal representing the absolute value of the interframe difference is compressed to a four-bit signal. In this case the motion adaptive signal processing circuit which is capable of 16-step switching, can perform smooth switching. In the case that a relatively small absolute value results, the original signal is regarded as noise. Thus, there can be no adverse effect caused by noise on the temporal-spatial signal processing circuit 10. The information signal representing the motion quantity of the picture is input to the temporal-spatial signal processing circuit 10 where the motion quantity information is expanded both in time and space, thereby correctly dealing with even a quick motion picture or a minutely detailed picture. Detailed information on the temporal-spatial signal processing circuit can be found in U.S. Pat. No. 4,733,297.

When a motion information signal is accompanied by a noise signal of an increased amplitude, however, the absolute value circuit 5 of the prior art arrangement cannot eliminate the noise component, allowing it to pass to the temporal-spatial signal processing circuit 10 where the noise signal is treated as a motion information signal, and is subjected to temporal and spatial expansion. Thus, the appearance of a noise signal of increased amplitude in a still picture will cause erroneous processing, that is, will result in a still picture signal being processed as if it were a motion picture signal. This erroneous processing will deteriorate the quality of the pictures displayed.

SUMMARY OF THE INVENTION

The object of the present invention is to provide a motion signal generating circuit which can avoid false detection of motion information signals due to noise and assure correct detection of motion information signals.

To attain this object, a motion signal generating circuit according to the present invention comprises a motion detecting circuit for detecting motion quantities if any, in a picture; a noise eliminator for eliminating pseudo-motion information signals caused by noise signals of increased amplitude from detection; and a temporal-spatial signal processing circuit for effecting temporal and spatial processing on the noise-free motion information signals in an expanded scale.

The motion detecting circuit uses an interframe difference signal to detect motion, if any, in a picture. The noise eliminator compares a motion information signal of a selected picture element with those of surrounding picture elements, thereby eliminating noise components, if any, from detection. The temporal-spatial signal processing circuit can expand only correct motion information signals both in time and space. Thus, the motion signal generator is free from malfunction due to a noise of increased amplitude, and can respond to quick motion of an object in pictures.

BRIEF DESCRIPTION OF THE DRAWINGS

Other objects and advantages of the present invention will be understood from the following description of preferred embodiments of the present invention, which are shown in the accompanying drawings.

DETAILED DESCRIPTION OF THE PREFERRED EMBODIMENTS

Figure 2:
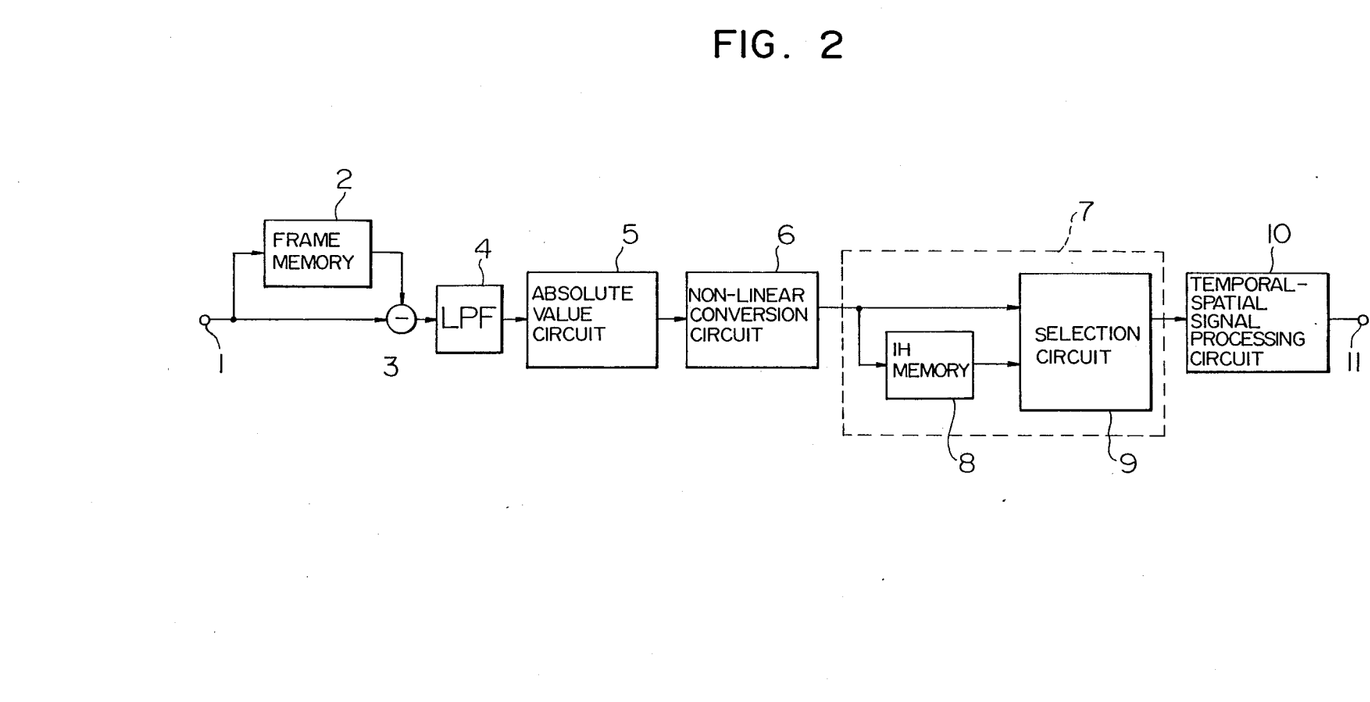
FIG. 2 is a block diagram showing a motion signal generating circuit according to a first embodiment of the present invention.

FIG. 2 shows a motion signal generating circuit according to a first embodiment of the present invention. It comprises a frame memory 2 connected to 1 an input terminal 1; a subtraction circuit 3 connected to the frame memory 2 and to the input terminal 1; a low-pass filter 4 connected to the subtraction circuit 3; an absolute value circuit 5 connected to the low-pass filter 4; a non-linear conversion circuit 6 connected to the absolute value circuit 5; a noise eliminator 7 connected to the non-linear conversion circuit 6; and a temporal-spatial signal processing circuit 10 connected to the noise eliminator 7 and to an output terminal 11. The noise eliminator 7 comprises a 1H memory 8 connected to an input terminal of the noise eliminator 7 and a selector circuit 9 connected to the memory 8 and the input terminal of the noise eliminator 7 and to an output terminal 11 of the noise eliminator 7. The 1H memory 8 is designed to delay an incoming signal and output it one scanning line period later.

In operation a digitized television signal is applied to the input terminal 1. This input signal and the preceding signal which is delayed one frame period by the frame memory 2, are directed to the subtraction circuit 3 to obtain an interframe difference signal. The color signal is inverted in phase for each frame, and therefore the interframe difference signal contains the color component in addition to the motion quantity. The color component is eliminated by the low-pass filter 4. The positive or negative sign is eliminated from the interframe difference signal in the absolute value circuit 5. As mentioned earlier, even if a signal for controlling the motion adaptive signal processor is a 4-bit signal, 16-step switching permits smooth control. A signal appearing at the output terminal of the absolute value circuit 5 is directed to the non-linear conversion circuit 6 where the signal is subjected to bit compression. Then, a signal appearing at the output terminal of the non-linear circuit 6 is directed to the noise eliminator 7 where any noise signal can be eliminated from the motion quantity signal by comparing the input signal and the precedent input signal which is delayed one scanning line period by the memory 2, and by appropriately selecting one or the other, as explained later. Thus, a noise-free signal appearing at the output terminal of the noise eliminator 7 is directed to the temporal-spatial signal processing circuit 10 where the signal is subjected to temporal and spatial expansion, permitting a correct detection even with respect to motion so quick or a picture so minutely detailed that correct detection could not be made with recourse to a difference signal between two subsequent frames. Finally a motion signal appears at the output terminal 11.

Figure 3A:
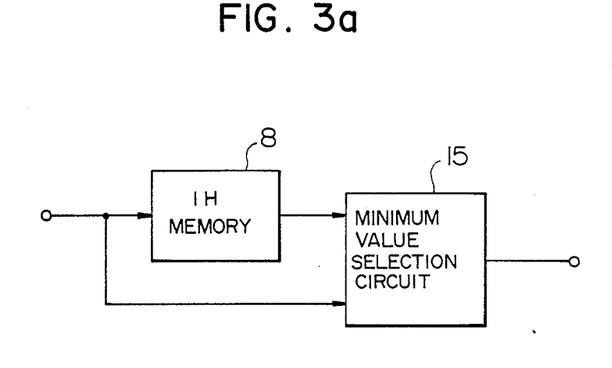
FIG. 3a is a block diagram showing a noise eliminator in a motion signal generating circuit of the present invention.
Figure 3B:
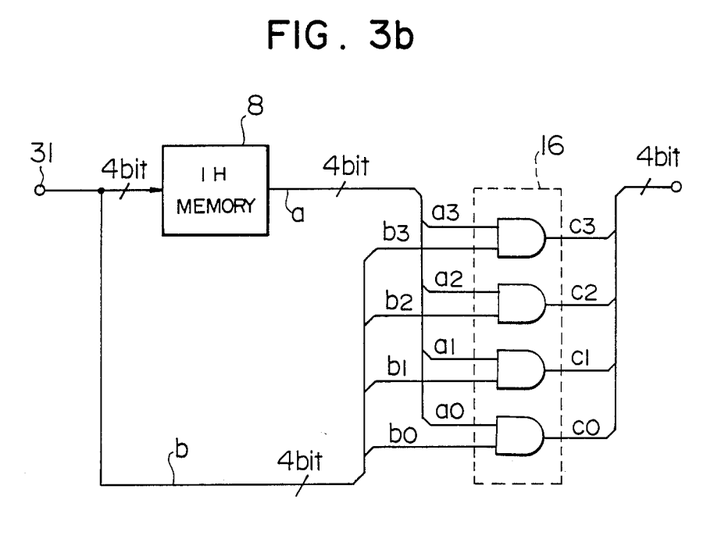
FIG. 3b is a block diagram showing another noise eliminator in a motion signal generating circuit of the present invention.
Figure 4:
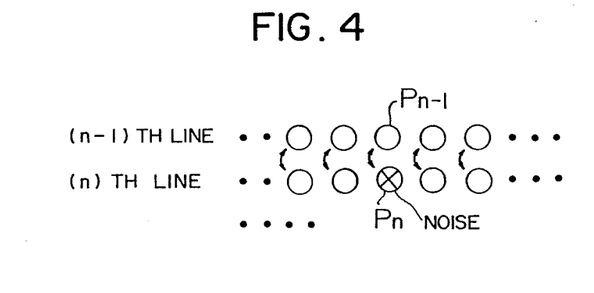
FIG. 4 diagrammatically represents the function of the motion signal generating circuit of the first embodiment.

Next, the noise eliminator 7 will be described in detail referring to FIGS. 3 and 4. FIG. 3a shows one example of a noise eliminator comprising a 1H memory 8 and a minimum value selection circuit 15, which is connected to the memory 8 and the input terminal of the noise eliminator, and to the output terminal thereof. Assume that a selected picture element $P_n$ in an (n)th line has a noise signal of increased amplitude as shown in FIG. 4. A signal representing the picture element $P_n$ is compared with a signal which represents a corresponding picture element $P_{n-1}$ in an (n−1)th line and is delayed one scanning line period by the memory 8 for selection. The required selection is made by the minimum value selector circuit 15. The signal representing the picture element $P_{n-1}$ will be selected according to the minimum value selection rule and will be output as a signal representing the motion quantity of the picture element $P_n$. Thus, the noise effect is eliminated. Even in case that the picture element $P_n$ is a motion picture element, the picture element $P_{n-1}$ is usually almost at the same level as the picture element $P_n$, and therefore selection of the noise-free picture element $P_{n-1}$ as a substitute for the disturbed picture element $P_n$ causes no problem. Alternatively an array of AND circuits 16 as shown in FIG. 3b may be used as a selector circuit 9. The signals appearing at the output terminals of the AND circuits represent a value almost equal to the minimum. The noise eliminator of FIG. 3b comprises a 1H memory 8 connected to an input terminal 31 of the noise eliminator and an array of AND circuits 16 connected to the input terminal 31 of the noise eliminator and the memory 8 and to the output terminal of the noise eliminator. In operation a 4-bit motion information signal (b3) (most significant bit), b2 (second most significant bit), b1 (third most significant bit), b0 (least significant bit)) is applied to the input terminal 31 of the noise eliminator, and the memory 8 outputs a 4-bit motion information signal (a3) (most significant bit), a2 (second most significant bit), a1 (third most significant bit), a0 (least significant bit)) for one horizontal scanning line ahead of the motion information signal (b3, b2, b1, b0). Then, a new 4-bit motion information signal (c3, c2, c1, c0) appears at the output terminal of the noise eliminator. Assume that a motion information signal of a selected still picture element represents wrong information (1 1 1 1) due to a noise signal, and that the preceding motion information signal (0 0 0 0) of the still picture element is free of noise. In this case, a new motion information signal (0 0 0 0) results. Thus, the wrong motion information signal is suppressed. Also, undesired expansion of the false motion information signal in the temporal-spatial signal processing circuit is prevented.

Figure 5:
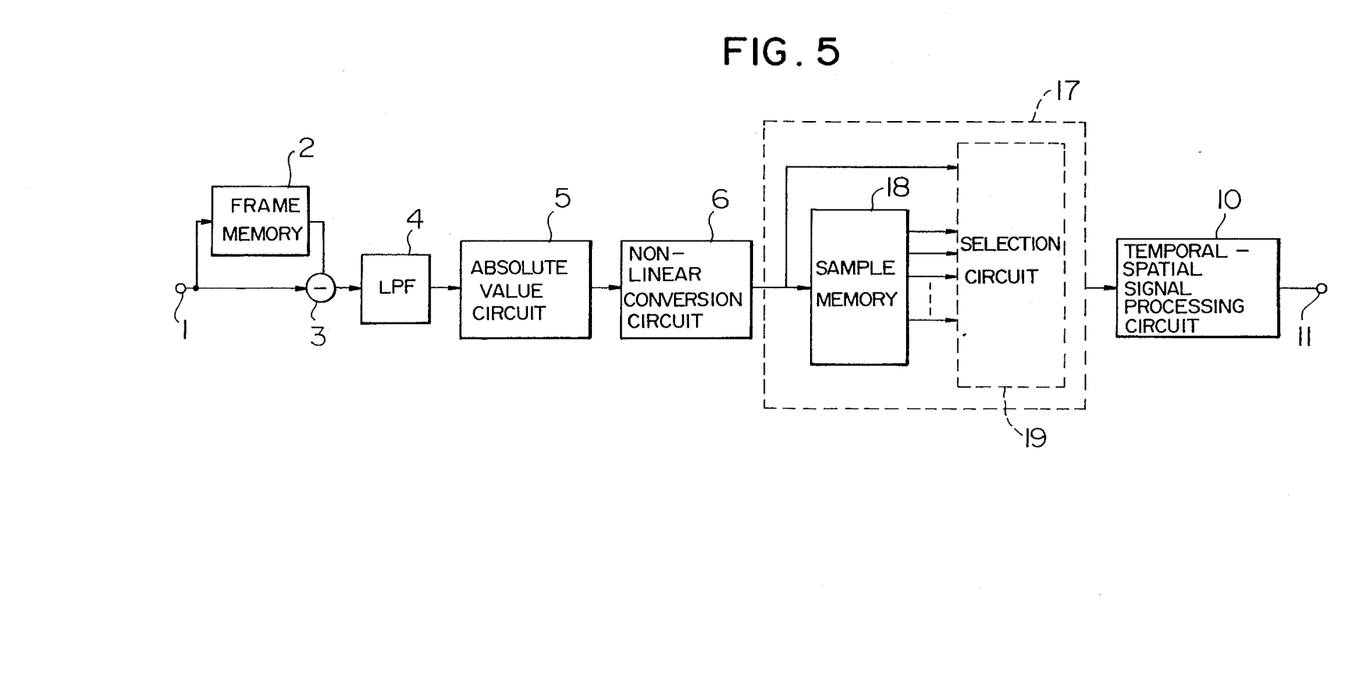
FIG. 5 is a block diagram showing a motion signal generating circuit according to a second embodiment of the present invention.

Referring to FIG. 5, there is shown a motion signal generating circuit according to a second embodiment of the present invention. It includes a noise eliminator of high precision which is capable of eliminating adverse effects caused by noise in signals representing picture elements each having little or no correlation with surrounding picture elements such as would be found at motion boundaries at which non-continuous change or interruption appears in motion.

Figure 11:
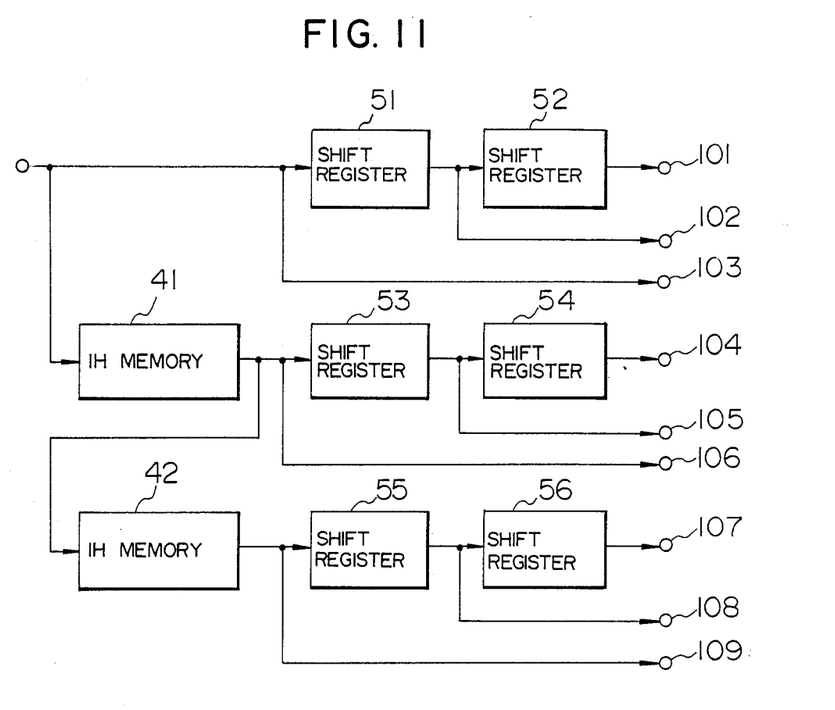
FIG. 11 is a block diagram representing the circuit arrangement of the sample memory in the noise eliminator of FIG. 8.
Figure 12:
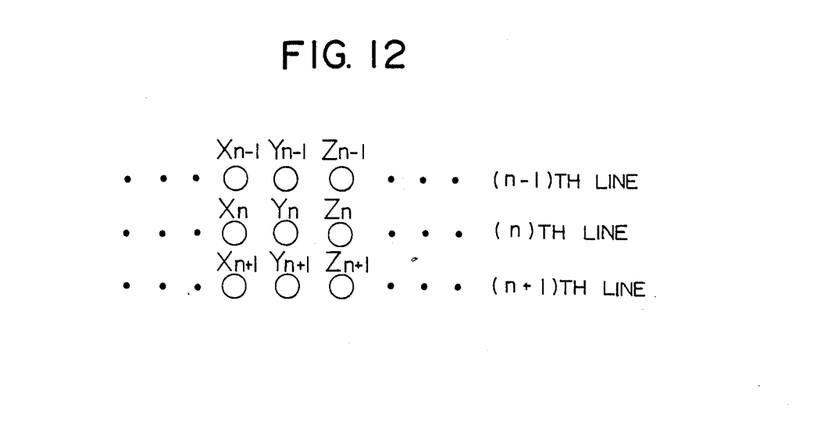
FIG. 12 diagrammatically represents the function of the noise eliminator.

The noise eliminator 17 comprises a sample memory 18 and a selection circuit 19. In operation a signal which is delayed one scanning line period in the sample memory 18 is compared with the subsequent signal which is input in the noise eliminator 17, for selection, and the so selected signal is output and directed to the temporal-spatial signal processing circuit 10 as a motion quantity signal. FIG. 11 shows the structure of the sample memory 18. It comprises two 1H memories 41 and 42, and six shift registers 51, 52, 53, 54, 55 and 56. The sample memory 18 provides motion information signals pertaining to, for instance, nine (3×3) picture elements $X_{n-1}$, $X_n$, $X_{n+1}$, $Y_{n-1}$, $Y_n$, $Y_{n+1}$, $Z_{n-1}$, $Z_n$, $Z_{n+1}$ around a selected picture element $Y_n$ (FIG. 12). The motion information signals pertaining to the picture elements $X_{n+1}$, $Y_{n+1}$, $Z_{n+1}$, $X_n$, $Y_n$, $Z_n$, $X_{n-1}$, $Y_{n-1}$ and $Z_{n-1}$ appear at output terminals 101, 102, 103, 104, 105 106, 107, 108 and 109 respectively.

Figure 6:
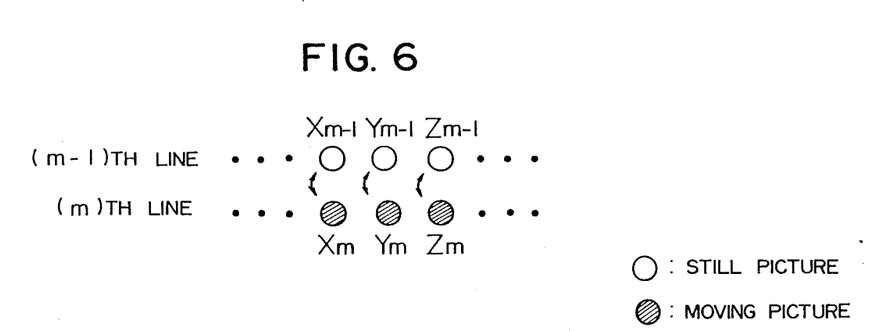
FIGS. 6 and 7 diagrammatically represent the function of the motion signal generating circuit of the second embodiment.
Figure 7:
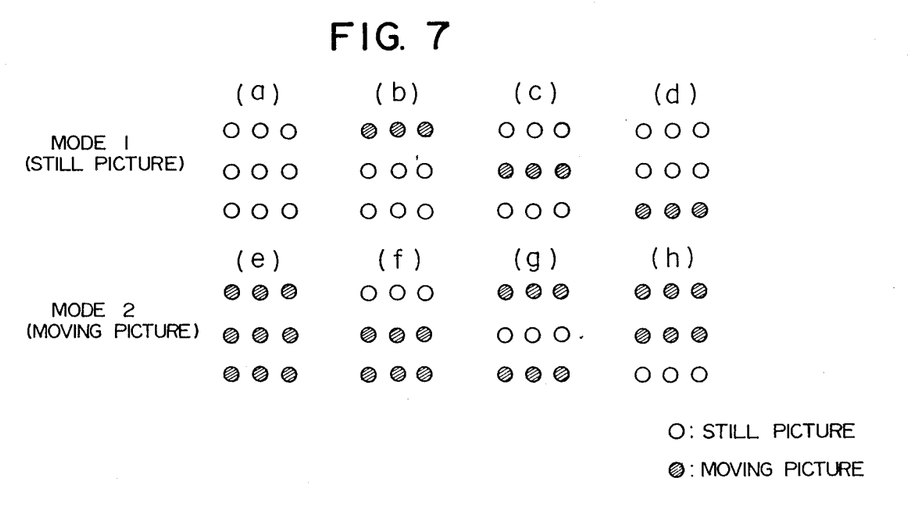
Figure 8:
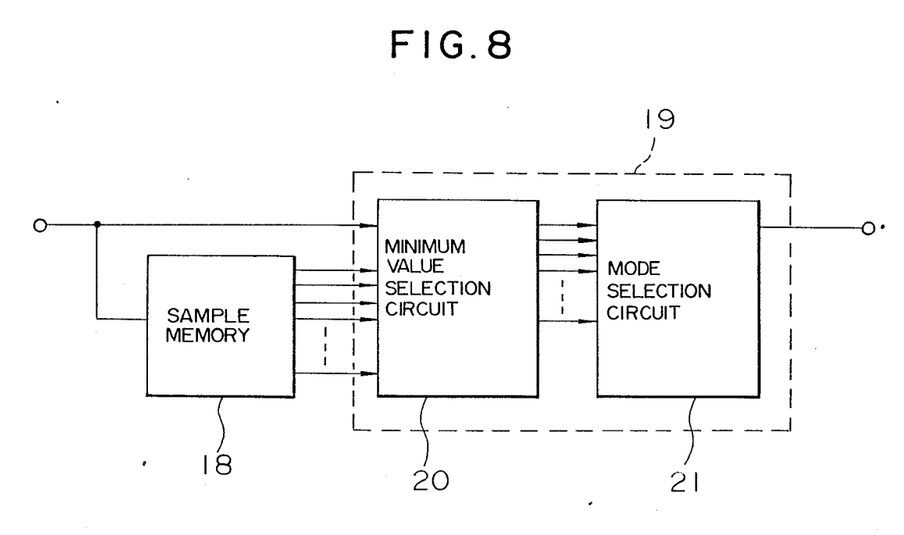
FIG. 8 is a block diagram showing a noise eliminator in the motion signal generating circuit of the second embodiment.

Referring to FIGS. 6, 7 and 8, the operation of the noise eliminator 17 is described below.

The noise eliminator 17 functions to make a general comparison between the motion information signal of a given picture element and those of surrounding picture elements for the sake of elimination of noise.

Assume that the motion boundary appears on the (m)th line. Specifically the signals of picture elements $X_m$, $Y_m$ and $Z_m$ in the (m)th line belong to a motion picture whereas the signals of picture elements $X_{m-1}$, $Y_{m-1}$ and $Z_{m-1}$ in the (m−1)th line belong to a still picture. If the noise eliminator 17 of the first embodiment is used, the signal of the picture element $Y_m$ would be compared with the signal of the picture element $Y_{m-1}$ according to the minimum value selection rule, and the signal of the picture element $Y_{m-1}$ would be selected and output as a motion information signal, disregarding and eliminating the signal of the picture element $Y_m$ as noise. This adverse function is attributable to no correlation existing between the picture elements $Y_{m-1}$ and $Y_m$ to be compared. In contrast to this, the noise eliminator 17 of the second embodiment will function to obtain the motion quantity signals of, for instance, 9 picture elements $X_{m-1}$, $Y_{m-1}$, $Z_{m-1}$, $X_m$, $Y_m$, $Z_m$, $X_{m+1}$, $Y_{m+1}$, $Z_{m+1}$ around a selected picture element $Y_m$, and make a selection among groups of three picture elements on the basis of minimum value. Specifically, these picture elements are classified into modes 1 and 2 (FIG. 7), and a decision as to whether or not the signal of the center picture element $Y_m$ is a signal representing a portion of a still picture, will be made depending on which mode the pattern of picture elements belongs to. FIG. 7 shows classification of different patterns of picture elements. In the drawing 8 patterns (a) to (h) each composed of 9 picture elements (3) (picture elements) times 3 (lines)) are classified into Modes 1 and 2. Particularly, Patterns (a) to (d) belong to Mode 1 whereas Patterns (e) to (h) beong to Mode 2. For instance, Pattern (c) contains a single line of picture elements representing a portion of a motion picture, and Pattern (g) contains a single line of picture elements representing a portion of a still picture. These foreign elements are regarded as noise, and Patterns (b) to (d) are classified into Mode 1 representing a still picture whereas Patterns (f) to (h) are classified into Mode 2 representing a motion picture. Thus, the adverse effect caused by noise can be eliminated. In the noise eliminator of FIG. 8 the mode selection circuit 21 selects Patterns (a) to (d) as representing portions of a still picture and Patterns (e) to (h) as representing portions of a motion picture to output the motion information signals as such.

Figure 9:
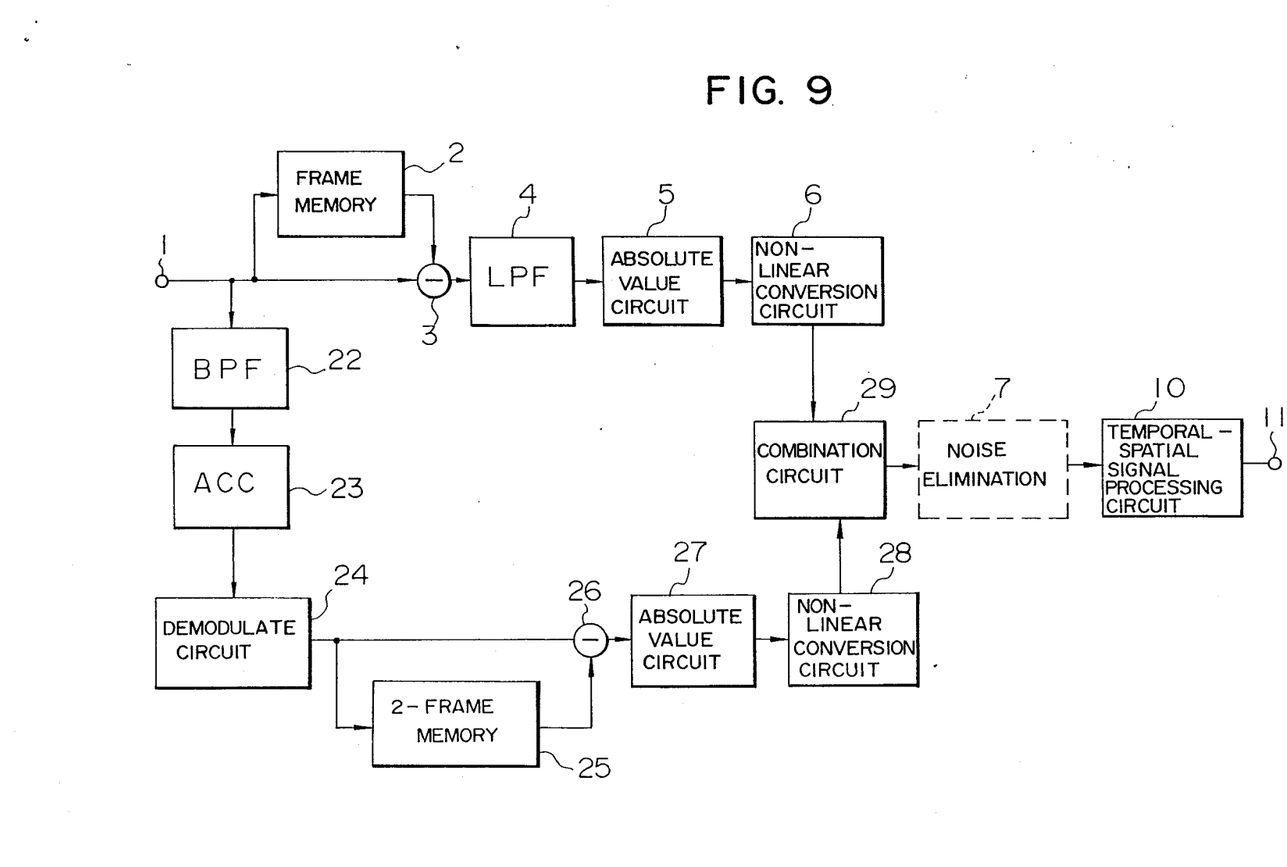
FIG. 9 is a block diagram showing a motion signal generating circuit according to a third embodiment of the present invention.

FIG. 9 shows a motion signal generating circuit according to a third embodiment of the present invention. It comprises a frame memory 2 connected to an input terminal 1, a subtraction circuit 3 connected to the input terminal 1 and to the memory 2, a low pass filter 4 connected to the subtraction circuit 3, an absolute value circuit 5 connected to the low pass filter 4, and a non-linear conversion circuit 6 connected to the absolute value circuit 5, a band pass filter 22 connected to the input terminal 1, an ACC circuit 23 connected to the band pass filter 22, a demodulator circuit 24 connected to the ACC circuit 23, a two-frame memory 25 connected to the demodulator circuit 24, a subtraction circuit 26 connected to the demodulator circuit 24 and the two-frame memory 25, an absolute value circuit 27 connected to the subtraction circuit 26, a non-linear conversion circuit 28 connected to the absolute value circuit 27, a combination circuit 29 connected to the non-linear conversion circuits 6 and 28, a noise eliminator 7 connected to the combination circuit 29, and a temporal-spatial signal processing circuit 10 connected to the noise eliminator 7 and an output terminal 11.

In this embodiment, motions if any, in brightness signals and color signals will be detected, and these motions when detected are combined. The resultant signal is subjected to noise elimination. With the arrangement of FIG. 9, the noise remaining after combination of brightness and color motions can be eliminated, providing motion information signals of improved accuracy, which are used as control signals. In operation, a digitized composite color television signal is applied to the input terminal 1, and an interframe difference signal appears at the output terminal of the subtraction circuit 3. This interframe difference signal is directed to the low-pass filter 4 and then to the absolute value circuit 5. The brightness movement quantity signal is provided at the output terminal of the absolute value circuit 5, and is bit-compressed in the non-linear conversion circuit 6.

On the other hand the color-band signal is separated from the digitized composite color television signal by the band-pass filter 22. The burst signal contained in the output signal of the band-pass filter 22 is controlled so as to remain at a given fixed level by the ACC circuit 23. Thus, color signals or fixed amplitude appear at the output terminal of the ACC circuit. Thereafter, the color signals are demodulated by the demodulator circuit 24 to provide a signal having two color signal components (R-Y) and (B-Y) multiplexed in dot permutation. The color subcarrier is inverted in phase for each frame period, while the demodulator circuit 24 is designed to permit cancellation of such inverted phases. The color band signal to be supplied to the demodulator circuit 24 contains harmonic components of the brightness signal. These harmonic components are inverted for each frame period, and the inverted harmonic components appear in the output signal of the demodulator circuit 24. This output signal is directed to the 2-frame memory 25 where it is delayed two frame periods. Then, the so-delayed signal and the output signal of the demodulator circuit 24 are supplied to the subtraction circuit 26 to obtain a difference signal between two signals which are two frame periods apart from each other. In these two signals, the harmonic components of the color and brightness signals are the same in phase. Therefore, no difference signal will appear for a still picture whereas a difference signal will appear for a moving picture. The positive or negative sign are removed from the difference signal in the absolute value circuit 27, and then the signal representing the absolute value of the difference signal is subjected to bit-compression in the non-linear conversion circuit 28. The movement quantities of the so compressed brightness and color signals are combined in the combination circuit 29, and the resultant signal is directed to the noise eliminator 7. The noise-free signal is supplied from the noise eliminator to the temporal-spatial signal processing circuit 10 where the signal is subjected to temporal and spatial expansion. Finally, the movement quantity signal appears at the output terminal 11, and will be used as a control signal.

In this embodiment, a separate movement detection is performed on each of the brightness and color signals. The sensitivities of the non-linear conversion circuits 6 and 28 can be controlled independently. After combining the brightness and color motions which are separately detected, noise which is conspicuous in the resultant signal can easily be eliminated almost completely.

Figure 10:
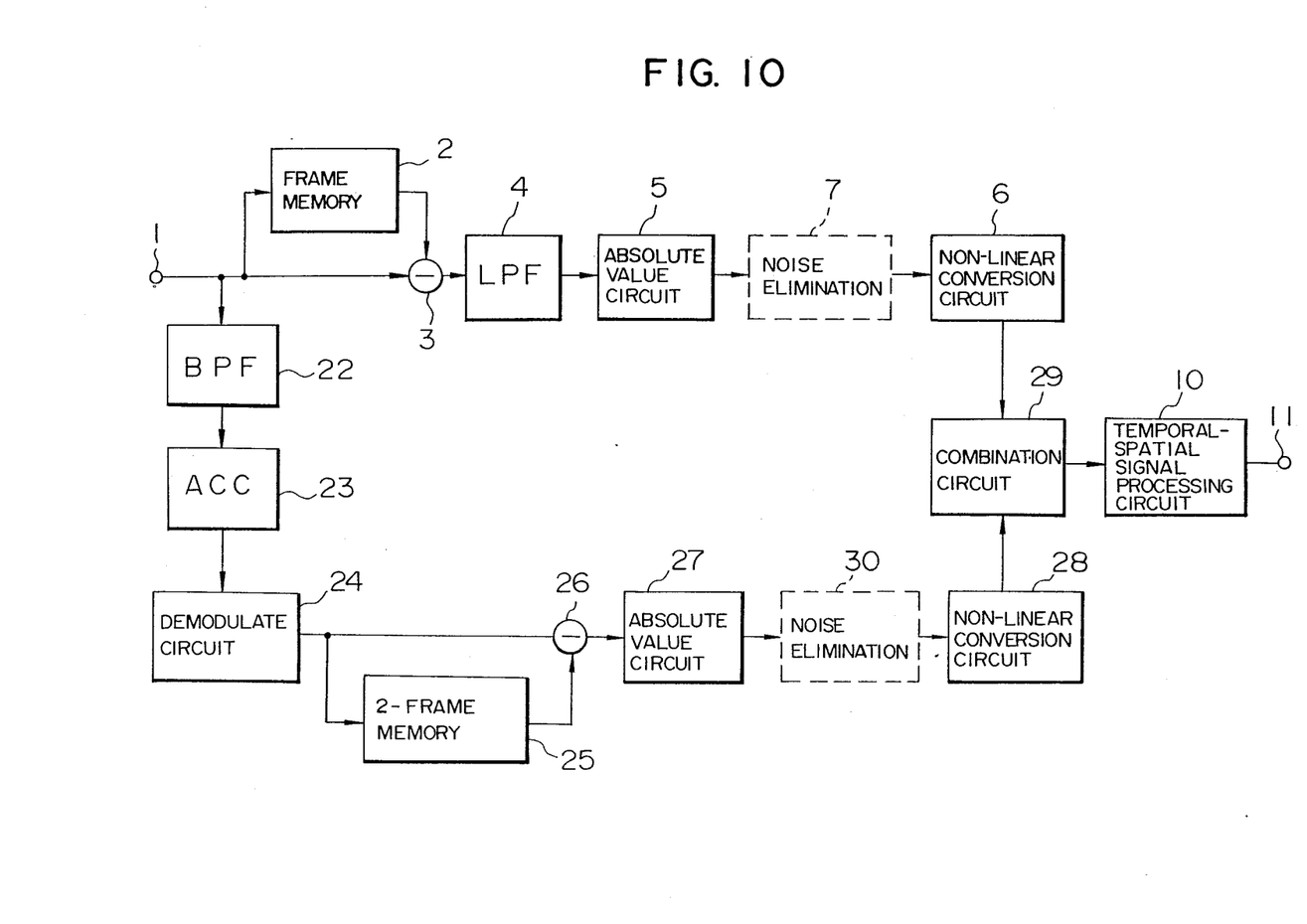
FIG. 10 is a block diagram showing a motion signal generating circuit according to a fourth embodiment of the present invention.

Finally, a motion signal generating circuit according to the fourth embodiment of the present invention is described below with reference to FIG. 10. The circuit arrangement of this embodiment is different from the third embodiment of FIG. 9 only in that the noise eliminators 7 and 30 are placed between the absolute value circuits 5 and 27 and the non-linear conversion circuits 6 and 28 in FIG. 10 rather than between the combination circuit 29 and the temporal-spatial signal processing circuit 10 in FIG. 9.

In this pre-noise elimination arrangement noise will be eliminated before the movement quantity signals which are detected from interframe difference signals, are bit-compressed in the non-linear conversion circuits. Elimination of noise prior to combination of brightness and color movement signals permits complete elimination of noise.

As for the brightness movement signal, the output signal of the absolute value circuit 5 is directed to the noise eliminator 7 where noise elimination is performed with almost the same number of bits as the digitized television signal at the input terminal 1. As for the color movement signal the output signal of the absolute value circuit 27 is applied to the noise eliminator 30, and then the noise-free signal is bit-compressed in the non-linear conversion circuit 28.

The brightness and color movement quantity signals thus bit-compressed are combined in the combination circuit 29, and the resultant signal is expanded in movement quantity in the temporal-spatial signal processing circuit 10 to be outputted from the output terminal 11 as a control signal.

In this embodiment, noise will be eliminated before the movement quantity signals are bit-compressed, and therefore noise elimination can be advantageously performed with reference to an increased amount of information. This permits complete elimination of noise. Some noise components which are hard to eliminate once the brightness and color movement quantity signals have been combined, can be eliminated in the arrangement of FIG. 10 because of separate detection of the brightness and color movement quantity signals and because of separate noise elimination from each of the brightness and color movement quantity signals. Thus, a control signal of high precision results.

As may be understood from the above, in a motion signal generating circuit according to the present invention no pseudo-motion or movement information signals will be caused by a noise signal of increased amplitude. Even if a motion information signal pertaining to a particular picture element has little or no correlation with the motion information signals of surrounding picture elements, noise can be completely eliminated, and no pseudo-motion information signal need be used as a control signal, eliminating the possibility of erroneously carrying out motion picture processing on a moving picture, and preventing deterioration of picture quality which would be caused by wrong signal processing.

What is claimed is:

1. A motion signal generating circuit in which motion information contained in a television signal is detected to provide a motion signal, comprising:
   (a) an input terminal for receiving a digitized television signal;
   (b) a motion information detecting circuit connected to said input terminal and including a frame memory for delaying said digitized television signal one frame period and providing the so-delayed television signal at the output terminal of said frame memory, and a subtraction circuit connected to said input terminal and said field memory to provide as a motion information signal a difference signal representing the difference between said digitized television signal supplied to said input terminal and said delayed television signal;
   (c) a noise eliminator circuit including a first one horizontal sweep period memory for receiving said motion information signal from said motion information detecting circuit and delaying said motion information signal one horizontal sweep period, and a selection circuit for comparing data of said motion information signal with data of said delayed motion information signal and selecting and outputting the signal whose data has a smaller value; and
   (d) a temporal-spatial signal processing circuit connected to said noise eliminator to process the output signal from said selection circuit both in terms of time and space, providing a motion signal.

2. A motion signal generating circuit according to claim 1 wherein said motion information detecting circuit further comprises:
   (1) an absolute value circuit which is responsive to said motion information signal for providing a signal representing the absolute value of said motion information signal; and
   (2) a non-linear conversion circuit which is responsive to said signal representing the absolute value of said motion information signal to compress non-linearly the data of said signal representing the absolute value of said motion information signal.

3. A motion signal generating circuit according to claim 1 wherein said selection circuit in said noise eliminator circuit comprises a plurality of AND circuits.

4. A motion signal generating circuit according to claim 1 wherein said selection circuit in said noise eliminator circuit is a minimum value selecting circuit.

5. A motion signal generating circuit according to claim 1 wherein said noise eliminator circuit further comprises a shift register connected to said first one horizontal sweep period memory.

6. A motion signal generating circuit according to claim 1 wherein said noise eliminator further comprises:
   (1) a first shift register connected to said first one horizontal sweep period memory;
   (2) a second one horizontal sweep period memory connected to said first one horizontal sweep period memory; and
   (3) a second shift register connected to said second one horizontal sweep period memory.

7. A motion signal generating circuit according to claim 2 wherein said motion information detecting circuit further comprises a low pass filter connected between said absolute value circuit and said subtraction circuit.

8. A motion signal generating circuit for detecting a piece of motion information from a television signal, comprising:
   (a) an input terminal to which a digitized television signal is supplied;
   (b) a frame memory for delaying said digitized television signal one frame period and providing the so delayed television signal at the output terminal of said frame memory;
   (c) a subtraction circuit connected to said input terminal and said frame memory to provide a difference signal representing the difference between said digitized television signal supplied to said input terminal and said delayed television signal;
   (d) an absolute value circuit which is responsive to said difference signal from said subtraction circuit for providing a signal representing the absolute value of said difference signal;
   (e) a noise eliminator circuit including a first one horizontal sweep period memory for delaying said signal representing the absolute value of said difference signal one horizontal sweep period and providing the so delayed absolute difference value signal; and a selection circuit for comparing data of said signal representing the absolute value of said difference signal with data of the so delayed absolute difference value signal, and selecting and outputting the signal whose data has a smaller value; and
   (f) a non-linear conversion circuit for nonlinearly compressing the signal selected and supplied by said selection circuit and outputting the so compressed signal as a motion information signal.

9. A motion signal generating circuit according to claim 8 further comprising a low-pass filter connected between said subtraction circuit and said absolute value circuit.

10. A motion signal generating circuit for detecting a piece of motion information from a television signal and providing a motion information signal, comprising:
   (a) an input terminal to which a digitized television signal is supplied;
   (b) demodulator means for demodulating the color signal in said digitized television signal;
   (c) memory means connected to said demodulating means to delay the demodulated color signal two frame periods;
   (d) a subtraction circuit connected to said demodulator means and said memory means to provide a difference signal representing the difference between a signal output by said demodulator means and a signal output by said memory means;
   (e) an absolute value circuit for providing a signal representing the absolute value of said difference signal;
   (f) a noise eliminator circuit including a one horizontal sweep period memory, and a selection circuit; and
   (g) a non-linear conversion circuit for nonlinearly compressing a signal output by said noise eliminator.

11. A motion signal generating circuit for detecting a piece of motion information from a television signal, comprising:
   (a) an input terminal to which a digitized television signal containing a color signal is supplied;
   (b) a first memory means connected to said input terminal for delaying and outputting said digitized television signal one frame period later;
   (c) a first subtraction circuit connected to said first memory and said input terminal for providing a first difference signal representing the difference between said digitized television signal at said input terminal and said digitized television signal thus delayed;
   (d) a first absolute value circuit responsive to said first difference signal from said subtraction circuit for providing a signal representing the absolute value of said first difference signal;
   (e) a first noise eliminator circuit comprising a first one horizontal sweep period memory for delaying and outputting said signal representing the absolute value of said first difference signal one horizontal sweep period later, and a first selection circuit;
   (f) a first non-linear conversion circuit for compressing non-linearly data of the signal selected by said first selection circuit;
   (g) demodulating means for demodulating said color signal in said digitized television signal;
   (h) a second memory means connected to said demodulating means to delay and output the demodulated color signal two frame periods later;
   (i) a second subtraction circuit connected to said demodulating circuit and said second memory means for providing a second difference signal representing the difference between the output signal of said demodulating circuit and the output signal of said second memory means;
   (j) a second absolute value circuit for providing a signal representing the absolute value of said second difference signal;
   (k) a second noise eliminator circuit comprising a second one horizontal sweep period memory and a second selection circuit;
   (l) a second non-linear conversion circuit for compressing non-linearly data of the output signal of said second noise eliminator circuit; and
   (m) a combination circuit connected to said first and second non-linear conversion circuits for combining the output signals thereof and providing the resultant signal as a motion information signal.

12. A motion signal generating circuit for detecting a piece of motion information from a television signal, comprising:
   (a) an input terminal to which a digitized television signal containing a color signal is supplied;

(b) a first memory means connected to said input terminal for delaying and outputting said digitized television signal one frame period later;

(c) a first subtraction circuit connected to said first memory and said input terminal for providing a first difference signal representing the difference between said digitized television signal at said input terminal and said digitized television signal thus delayed;

(d) a first absolute value circuit responsive to said first difference signal from said subtraction circuit for providing a signal representing the absolute value of said first difference signal;

(e) a first non-linear conversion circuit for compressing non-linearly data of said first difference signal;

(f) demodulating means for demodulating said color signal in said digitized television signal;

(g) a second memory means connected to said demodulating means to delay and output the demodulated color signal two frame periods later;

(h) a second subtraction circuit connected to said demodulating circuit and said second memory means for providing a second difference signal representing the difference between the output signal of said demodulating circuit and the output signal of said second memory means;

(i) a second absolute value circuit for providing a signal representing the absolute value of said second difference signal;

(j) a second non-linear conversion circuit for compressing non-linearly data of said second difference signal;

(k) a combination circuit for combining the output signals of said first and second non-linear conversion circuits; and (l) a noise eliminator circuit comprising a one horizontal sweep period memory for delaying and outputting the output signal of said combination circuit one horizontal sweep period later, and a selection circuit for comparing data of the output signal of said combination circuit with data of the output signal of said one horizontal sweep period memory and selecting the signal whose data has a smaller value.

* * * * *